No. 837,482.  
PATENTED DEC. 4, 1906.  
J. LIBERT.  
PIPE JOINT.  
APPLICATION FILED AUG. 25, 1904.
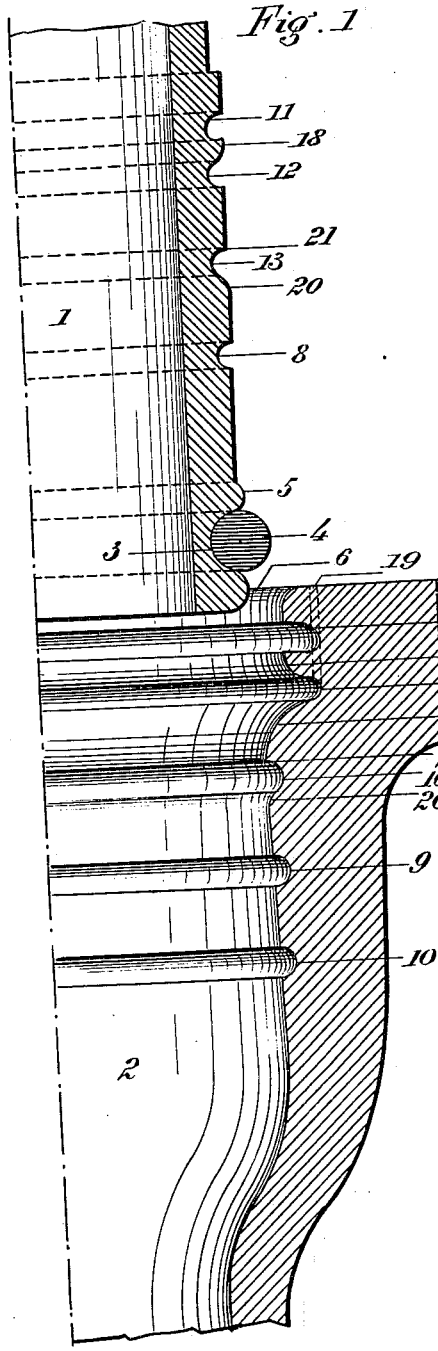
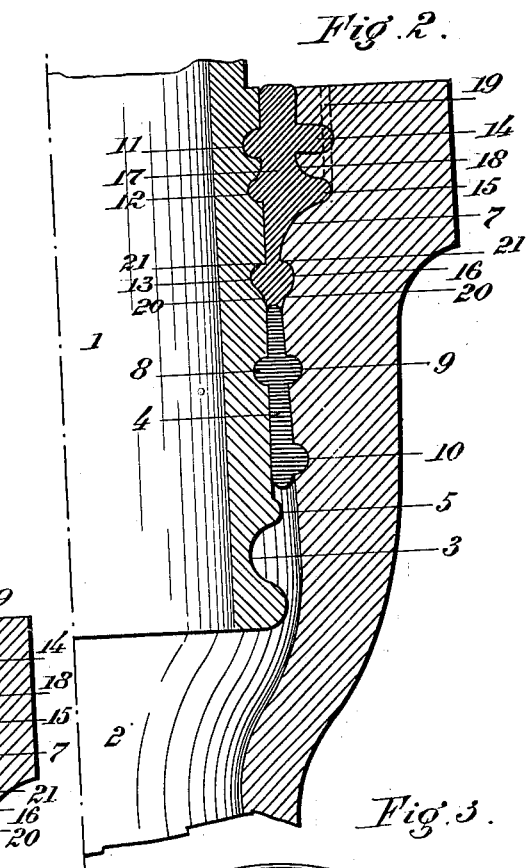
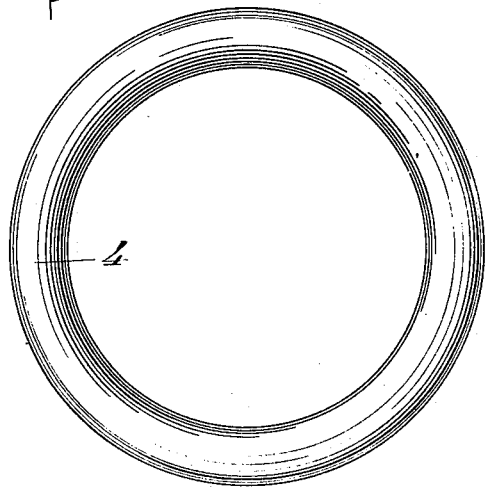
Witnesses  
George G. Schoenlank  
Thomas Kilpatrick
Inventor  
Jean Libert  
by H. van Oldenneel  
Attorney

UNITED STATES PATENT OFFICE.

JEAN LIBERT, OF BRUSSELS, BELGIUM.

PIPE-JOINT.

No. 837,482.　　　Specification of Letters Patent.　　　Patented Dec. 4, 1906.

Application filed August 25, 1904. Serial No. 222,106.

*To all whom it may concern:*

Be it known that I, JEAN LIBERT, manufacturer, a subject of the King of Belgium, residing at Brussels, Belgium, have invented a new and useful Improvement in or Relating to Pipe-Joints; and I do hereby declare the following to be a full, clear, and exact description of the same.

This invention relates to a pipe-joint for pipes of any size, said joint being capable of being used either with rubber or with lead packing or with both together.

In the event of rubber being used a rubber ring is compressed in a special way between the two parts and held in grooves of special kind provided on the inner surface of the socket portion, so that an accidental separation of the joint is prevented and the joint becomes the better the greater the pressure in the pipe.

When lead is used, the joint according to this invention requires only a small quantity of lead; but nevertheless it is very strong, owing to the grooves into which the metal is cast and which render superfluous the usual calking or hammering, which occupies considerable time.

In any case the joint according to this invention has great advantages as regards strength, security, simplicity, and rapidity of making and resistance to high pressure.

A joint according to this invention with multiple packing is illustrated, by way of example, in the accompanying drawings, in which—

Figure 1 shows the male end and the female end or socket of two pipes before they have been connected, and Fig. 2 shows the completed joint, Fig. 3 showing the rubber packing-ring.

The male end 1 of one pipe which enters the female end 2 of the other pipe or socket is provided near its outer edge with a wide annular groove 3, the diameter of which corresponds to that of the packing-ring 4, made of rubber or the like, an annular projection or beading 5 being arranged behind the said groove to prevent shifting of the rubber ring by the edge 6 of the socket when the male end is introduced into the female end and to facilitate centering of the parts. The compression and displacement of the rubber ring begins only when the inner edge 7 of the conic portion 2 of the socket widened outward comes in contact with the rubber ring, and the compression increases with the introduction of the also tapering male portion 1, the rubber ring being carried on until it comes into the flattened position shown in Fig. 2, in which position it is held fast by a groove 8 in the male portion and a groove 9 situated above it and a second groove 10 in the female portion. Owing to the male and to the female portion tapering in opposite directions, the rubber ring is more and more compressed and at the same time expands in the grooves 8, 9, and 10. This expansion increases with the internal pressure in the pipe, so that the joint is the better the greater the pressure it has to resist.

For holding fast lead packing, which must be used in certain cases, the male end is provided with preferably three grooves 11 12 13, of semicircular cross-section, arranged at suitable distances apart, more or less deep grooves 14 15 16 in the female portion corresponding to the same. These grooves serve for securing the metal packing 17, which after becoming hard forms a completely-closing circular wedge which renders superfluous the costly and tedious calking of the joint.

For facilitating the introduction of the packing metal the edges 18 18 of the grooves 12 15 are preferably rounded off, air being allowed to escape through a small passage 19. The inner edges 20 20 of the grooves 13 and 16 are also rounded off for facilitating the introduction of the rubber packing into these grooves when the ring employed is too thick. The edges 21 21 of these grooves are, on the contrary, made sharp in order to prevent the rubber from expanding beyond the said grooves.

As will be seen from the drawings, the arrangement is such that there is sufficient free space between the ends of the male and of the female portion for the purpose of providing for expansion of the pipes.

In the event of it being desired to use the joint described with only a rubber packing the lead is replaced by some suitable material. The rubber ring can also be replaced by a material adapted to insure a perfectly tight joint.

Having thus described my invention, what I claim, and desire to secure by Letters Patent, is—

1. A pipe-joint, comprising a male and a female portion having their opposing surfaces tapered in opposite directions, the male part of said joint having an annular groove 3 of large diameter to receive a rubber ring circular in cross-section and grooves in the opposing faces of the said male and female portions above or in rear of the said groove 3 and receiving the rubber ring carried thereby said rubber ring being deformed in cross-section and lying in the said grooves in the opposing face of the parts the said groove 3 being adapted to permit the withdrawal therefrom of the said rubber ring under pressure.

2. A pipe-joint, comprising a male and female portion, the male part of said joint having an annular groove 3 of large diameter to receive a ring of compressible elastic material, and grooves in the opposing faces of said male and female portions above or in rear of said groove 3 and receiving the said ring carried thereby, said compressible ring being deformed in cross-section and lying in the said grooves in the opposing faces of the parts, and said groove 3 being adapted to permit the withdrawal therefrom of said compresssible ring under pressure.

3. A pipe-joint comprising a male and female portion, the male part of said joint having external annular grooves one of which is of large diameter, and the female part having internal grooves corresponding to the smaller external grooves aforesaid, and a ring of compressible elastic material compressed between the male and female portions and in the several grooves hereinbefore mentioned.

4. A pipe-joint, comprising a male and female portion, the male part having a succession of external annular grooves and the female part having a succession of internal grooves, a ring of compressible elastic material compressed between the male and female portions and in opposite grooves of said portions, and a cast metallic ring between said male and female portions and next to the ring first named.

In testimony whereof I have signed this specification in the presence of two subscribing witnesses.

JEAN LIBERT.

Witnesses:
CHARLES HORNEY,
GREGORY PHELAN.